(12) United States Patent
Evers

(10) Patent No.: US 9,500,244 B2
(45) Date of Patent: Nov. 22, 2016

(54) VIBRATION ISOLATOR WITH COIL SPRING

(71) Applicant: Integrated Dynamics Engineering GmbH, Raunheim (DE)

(72) Inventor: Arndt Evers, Oestrich-Winkel (DE)

(73) Assignee: Integrated Dynamics Engineering GmbH (DE)

( * ) Notice: Subject to any disclaimer, the term of this patent is extended or adjusted under 35 U.S.C. 154(b) by 0 days.

(21) Appl. No.: 14/165,073

(22) Filed: Jan. 27, 2014

(65) Prior Publication Data

US 2014/0209778 A1    Jul. 31, 2014

(30) Foreign Application Priority Data

Jan. 29, 2013  (EP) ..................... 13153154

(51) Int. Cl.
| | |
|---|---|
| *F16F 15/067* | (2006.01) |
| *F16F 1/12* | (2006.01) |
| *F16F 15/06* | (2006.01) |
| *F16F 3/02* | (2006.01) |
| *F16F 15/04* | (2006.01) |

(52) U.S. Cl.
CPC ............... *F16F 1/121* (2013.01); *F16F 1/128* (2013.01); *F16F 3/02* (2013.01); *F16F 15/063* (2013.01); *F16F 15/046* (2013.01)

(58) Field of Classification Search
CPC .............. F16F 3/00; F16F 7/00; F16F 7/104; F16F 9/00; F16F 9/3207; F16F 9/44; F16F 9/443; F16F 9/50; F16F 9/54; F16F 9/56; F16F 13/00; F16F 15/04; F16F 15/046; F16F 1/121; F16F 1/128; F16F 3/02; F16F 15/063; F16F 15/067
USPC .............. 267/136, 140.14, 140.15, 175, 177, 267/291; 248/550, 578
See application file for complete search history.

(56) References Cited

U.S. PATENT DOCUMENTS

| | | | | |
|---|---|---|---|---|
| 1,916,080 | A | * | 6/1933 | Somervell ................ B61F 5/12 105/197.05 |
| 2,137,074 | A | * | 11/1938 | Blomberg ................ B61F 3/08 105/194 |
| 3,516,636 | A | * | 6/1970 | Burke ........................... 248/578 |
| 4,436,112 | A | * | 3/1984 | Atkins et al. ................ 137/510 |
| 4,473,362 | A | * | 9/1984 | Thomey et al. ............. 474/135 |
| 5,370,104 | A | * | 12/1994 | Neie .............................. 124/89 |
| 6,022,005 | A | * | 2/2000 | Gran et al. .................... 267/136 |
| 2002/0179377 | A1 | * | 12/2002 | Higaki et al. ................ 187/292 |
| 2007/0151819 | A1 | * | 7/2007 | Schmidt et al. ............. 188/377 |
| 2009/0218739 | A1 | * | 9/2009 | Terada et al. .................... 267/2 |
| 2013/0043629 | A1 | * | 2/2013 | Gousseinov et al. ......... 267/172 |
| 2014/0306432 | A1 | * | 10/2014 | Obayashi et al. ......... 280/728.2 |

FOREIGN PATENT DOCUMENTS

| | | | |
|---|---|---|---|
| JP | 09053684 | A | 2/1997 |
| JP | 09053684 | A * | 2/1997 |
| JP | 2002234325 | A * | 8/2002 |

* cited by examiner

*Primary Examiner* — Melody Burch
(74) *Attorney, Agent, or Firm* — Kaplan Breyer Schwarz & Ottesen, LLP

(57) ABSTRACT

The invention relates to a vibration isolator that includes a coil spring. In a horizontal direction, the coil spring is stiffly coupled to the base or to the load to be isolated.

9 Claims, 5 Drawing Sheets

VIBRATION ISOLATOR WITH COIL SPRING

CROSS-REFERENCE TO RELATED APPLICATIONS

European Patent Application No. 13 153 154.3, with a filing date of Jan. 29, 2013, is incorporated herein by reference.

FIELD OF THE INVENTION

The invention relates to a vibration isolator that includes a coil spring, and to a vibration isolation system. More particularly the invention relates to a vibration isolation system which is used for vibration-isolated mounting of machines, in particular in the field of semiconductor industry.

BACKGROUND OF THE INVENTION

Vibration isolation systems which include a coil spring, mostly in form of a steel spring, are known. In such a system a load to be isolated from the ground is mounted on three or more vibration isolators which include a coil spring that is effective at least in a vertical direction.

Such coil springs provide for passive vibration isolation in a very simple way, in particular even for quite heavy components.

Above the natural frequency of the spring-mass system, vibration isolation is achieved.

The isolation effect of such vibration isolation systems can be improved by configuring the vibration isolation system as an active vibration isolation system, in particular when used to mount sensitive equipment in semiconductor industry, such as lithography apparatus.

In such an active vibration isolation system, sensors are arranged on the load to be isolated and/or on the ground, and via a control loop at least one actuator is controlled, which actively counteracts vibrations. Especially non-contact force actuators are used as the actuator, in particular based on the Lorentz principle.

The employed mechanical spring systems are adapted to the weight of the load to be mounted. This is necessary because in the region of load limit a mechanical spring does no longer behave linearly and can be damaged.

Since the deflection of a coil spring is substantially linearly related to the applied force, it will be understood that the level of the anti-vibration mounted load varies with the weight thereof.

In order to compensate for variations of the load supported with isolation, or for a non-uniform force distribution, it is known in practice to provide for height adjustment in such a mechanical spring system including a coil spring.

Such a level correction may for example be implemented in a very simple manner using a height-adjustable spring plate.

An operator adjusts the vibration isolation system in a resting position.

Adjustment is for example effected by means of an adjusting element in form of a nut which is guided on a threaded rod.

However, it has now been found that during mechanical height adjustment torques may be generated in the mechanical spring system, which may result in a horizontal force. This horizontal force component usually leads to a horizontal shift of the anti-vibration mounted load, which is undesirable.

In active vibration isolation systems, a horizontal shift is particularly disadvantageous, since the opposite components of non-contact actuators will be offset thereby relative to one another. In case of a Lorentz coil, for example, this may result in that the plunger coil touches the permanent magnet, or it will at least result in that the size of the air gap between the plunger coil and the permanent magnet is no longer in the desired range.

Thus, after height adjustment the vibration isolation system additionally has to be adjusted in the horizontal direction, which is cumbersome.

OBJECT OF THE INVENTION

Therefore, an object of the invention is to mitigate the drawbacks of the prior art mentioned above.

A more particular object of the invention is to provide a height-adjustable vibration isolation system including coil springs, which permits height adjustment without shifting the anti-vibration mounted load in a horizontal direction.

SUMMARY OF THE INVENTION

The object of the invention is already achieved by a vibration isolator according to the independent claim.

Preferred embodiments and modifications of the invention are set forth in the dependent claims.

The invention relates to a vibration isolator which is in particular adapted to accommodate anti-vibration mounted apparatus such as those used in semiconductor industry. Thus, it relates to a vibration isolator which is used in stationary installed vibration isolation systems.

In its installed state, the vibration isolator comprises a base. This base is usually formed as a frame which is placed on the ground. It will be understood, however, that it is conceivable for the vibration isolator to be directly placed on the ground, so that the ground serves as a base.

Using a coil spring which in particular is formed as a steel spring, a load to be supported with vibration isolation is anti-vibration mounted through a coil spring that is effective at least in the vertical direction.

For this purpose, the coil spring is arranged between the base and the load to be isolated. A coil spring refers to a spiral spring element which is effective as a mechanical spring at least in the main extension direction of the spring. Coil springs are typically formed as a cylindrically coiled spring wire. It will be appreciated that for the purposes of the invention other types of such a spring may also be used.

The anti-vibration mounted load typically includes a frame or table which serves to receive anti-vibration mounted devices.

The vibration isolator is adapted to be adjustable in height by means of an adjusting element. In particular a nut arranged on a threaded rod may be used as an adjusting element.

In particular a spring plate, preferably a lower spring plate, may be configured to be adjustable in height by means of a nut.

According to the invention, in a horizontal direction the coil spring is stiffly coupled to the base or to the load to be isolated.

The words "horizontal" and "vertical" in the sense of the invention refer to the position of the vibration isolator when installed in its intended condition.

Rigid joining in a horizontal direction in the sense of the invention means that stiffness in the horizontal direction is substantially greater than stiffness in the vertical direction.

Specifically, stiffness in the horizontal direction is at least twenty times greater than stiffness in the vertical direction.

Since thus the coil spring does no longer provide any significant vibration isolation in the horizontal direction, the vibration isolator of one preferred embodiment of the invention comprises a further component for providing horizontal vibration isolation.

Especially a flexible rod or a buckling pendulum may be used as the further component.

In particular, with an identical coil spring the use of a flexible rod allows for very easy adjustment of the horizontal stiffness by replacing the buckling pendulum.

In one modification of the invention, the flexible rod or buckling pendulum is attached to an extension that protrudes into the coil spring.

In this manner, the coupling point between flexible rod or buckling pendulum and coil spring is offset into the coil spring. Preferably, the extension protrudes into the coil spring along at least one third of the length of the coil spring.

This permits in a simple manner to obtain a low horizontal stiffness in a small space. At the same time, a tendency of the system to tilt is reduced by having the attachment point offset downwards.

In one preferred embodiment of the invention, in a horizontal direction the coil spring is stiffly coupled to the base or to the load to be isolated by means of at least one leaf spring.

By using a leaf spring arranged horizontally it is very easily possible to provide a component which exhibits a high stiffness in horizontal direction but may be provided with a low stiffness in the vertical direction.

It will be understood that the use of a leaf spring involves an additional vertical stiffness.

However, this is even advantageous insomuch as the leaf spring can be replaced comparatively easily, so that the natural frequency of the vibration isolator can easily be adapted to the respective installation place through the additional vertical stiffness of the leaf spring.

Thus, a vibration isolation system may be provided, in which the individual isolators include an identically configured coil spring but have a different stiffness because of differently configured leaf springs (vertically) and/or differently configured flexible rod or buckling pendulum (horizontally).

By adjusting the stiffness the natural frequency of the individual vibration isolators may in particular be adapted in a manner so that all vibration isolators exhibit substantially the same natural frequency. Different natural frequencies of the individual isolators should be avoided, as this may cause a swaying movement of the load to be isolated. If now the load on one vibration isolator is greater, for example because of a non-symmetrical center of gravity, the stiffness of that vibration isolator may be increased correspondingly to match the natural frequency thereof to that of the other vibration isolators.

Furthermore, the leaf spring permits to very easily adapt the vertical stiffness to the respective installation place without that the coil spring needs to be replaced.

Preferably, in the horizontal direction, the coil spring is stiffly coupled to the base or to the load to be isolated by means of at least two leaf springs that are spaced from each other. In this manner, tilting and thus a possible reduction of horizontal stiffness is avoided.

In a preferred embodiment of the invention the coil spring is arranged in a housing which in turn is connected to the base or to the load to be isolated, in particular through a leaf spring, and the housing is only movable in the vertical but not in the horizontal direction relative to the base or to the load to be isolated.

For a simple configuration of the vibration isolator, the housing may comprise a spring plate.

In one modification of the invention, the vibration isolator comprises a housing in which the coil spring is arranged, and an outer housing, wherein in the horizontal direction the outer housing is stiffly coupled to the housing and is connected to the base or to the load to be isolated.

The housing including the spring and the outer housing are therefore only movable relative to one another in a vertical direction.

In one preferred embodiment of the invention, the outer housing comprises at least one recess through which the adjusting element is accessible.

The vibration isolator according to the invention is especially used in active vibration isolation systems, i.e. vibration isolation systems which include at least one sensor for detecting vibrations and at least one actuator for active vibration isolation.

The actuator is in particular configured as a linear magnetic actuator.

Especially magnetic actuators working after the Lorentz principle are used, which comprise a plunger coil that is disposed between blades that comprise magnets.

DETAILED DESCRIPTION

Figure 1:
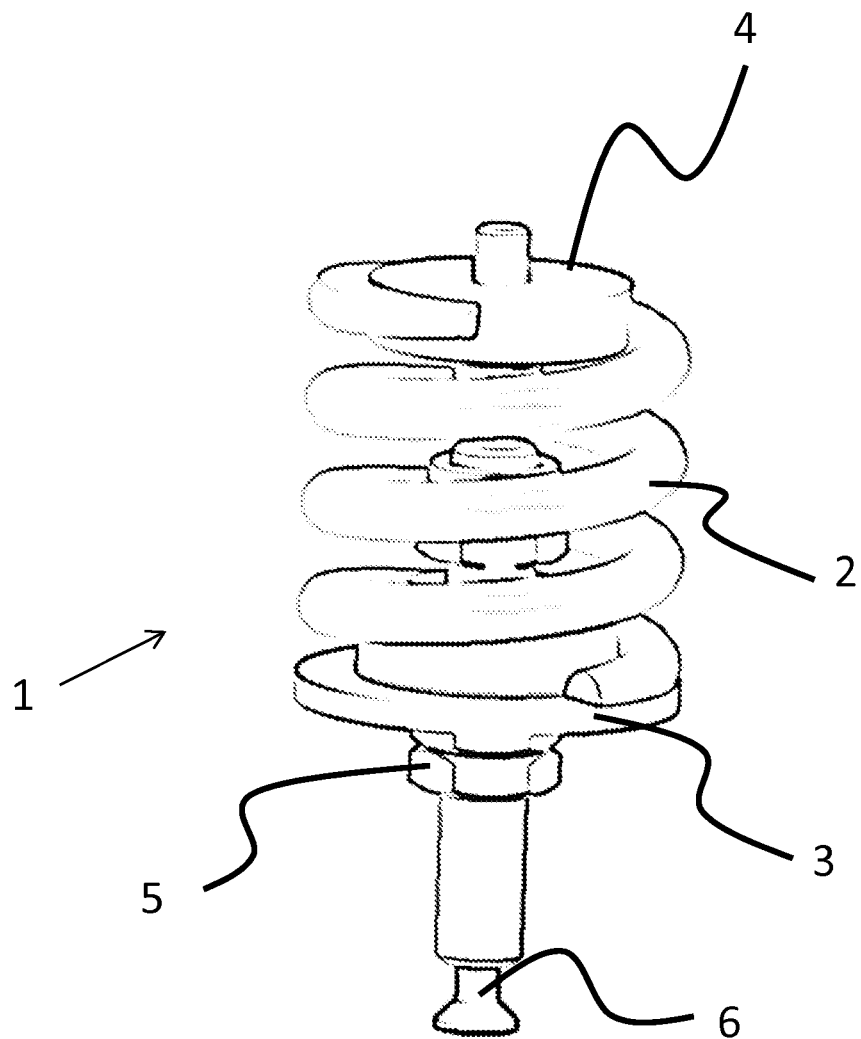
FIG. 1 schematically illustrates the essential components of a vibration isolator 1 which comprises a coil spring 2.

The invention will now be described in more detail with reference to an exemplary embodiment schematically illustrated in the drawings of FIGS. 1 to 5.

FIG. 1 schematically illustrates the essential components of a vibration isolator 1 which comprises a coil spring 2.

Coil spring 2 is connected to a lower spring plate 3 and to an upper spring plate 4 and in this manner, through the spring plates, it may be attached to the anti-vibration mounted load and to the base.

Lower spring plate 3 is adjustable in the vertical direction by means of an adjusting element 5 which is configured as a nut arranged on a threaded rod in this exemplary embodiment. Using a fastening member 6 which is configured as a screw in this exemplary embodiment, lower spring plate 3 is secured to the base.

The anti-vibration mounted load is connected to the base through coil spring 2.

It will be understood that in this way, in the installed state, vibration isolation is achieved in the vertical direction, i.e. along the main extension direction of coil spring 2.

Also it will be understood that coil spring 2 is also effective in the horizontal direction.

If now there are no additional components which prevent a displacement of the lower 3 and upper spring plate 4 in the horizontal direction, a horizontal displacement will generally be produced upon actuation of adjusting element 5, since typically a torque will be transferred to the lower spring plate 3 when turning adjusting element 5, so that a force is produced in the horizontal direction.

Figure 2:
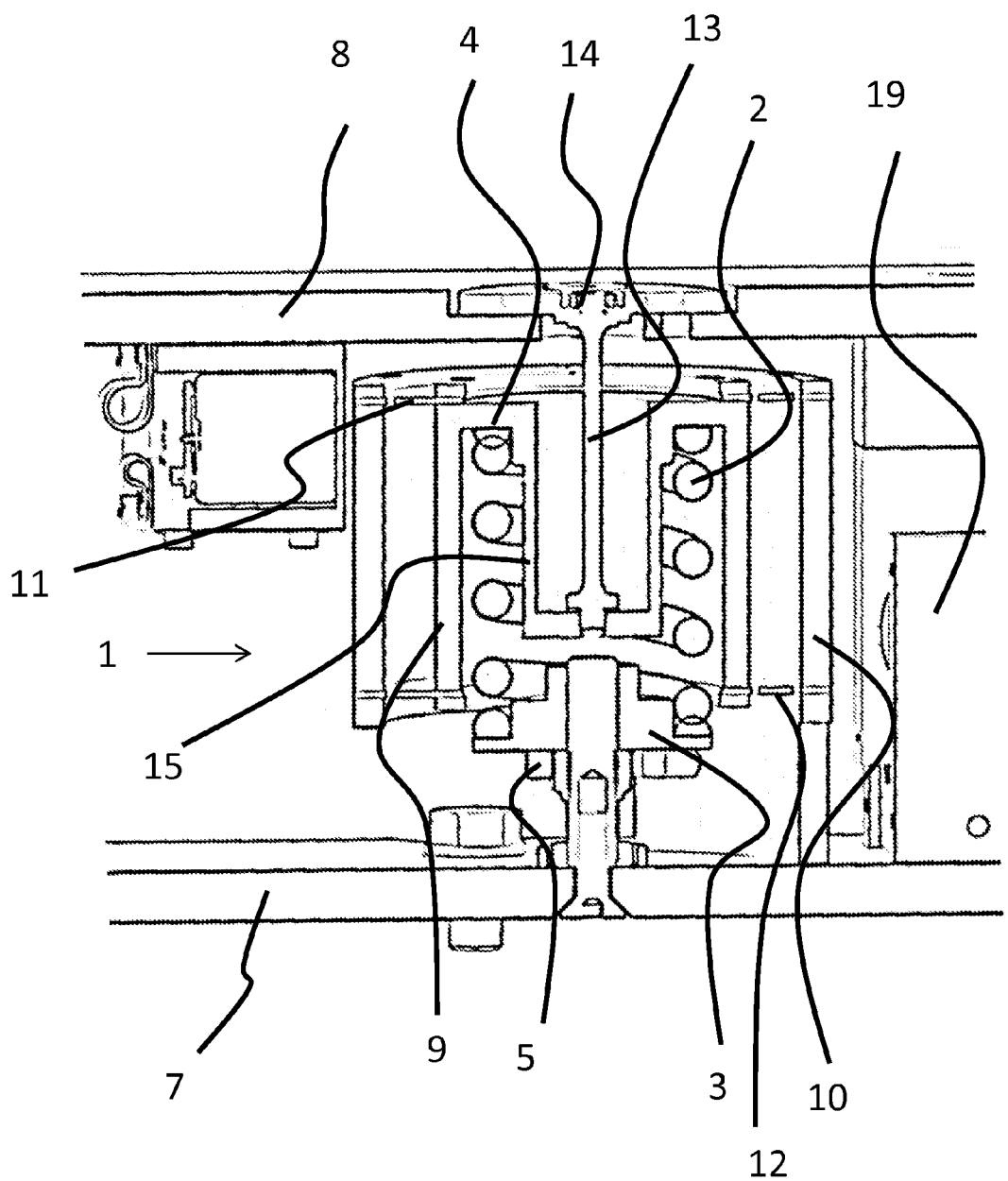
FIG. 2 shows the vibration isolator 1 in an installed state.

FIG. 2 shows the vibration isolator 1 in an installed state, and now the other components are also shown, by means of which coil spring 2 is stiffly coupled to the base or to the load to be isolated.

For this purpose, coil spring 2 is arranged in a housing 9.

Housing 9 in turn, which may be regarded as an inner housing, is coupled with an outer housing 10 through vertically spaced leaf springs 11, 12, and the outer housing is secured to base 7.

Due to the high stiffness of leaf springs 11, 12 in the horizontal direction, housing 9 is only movable relative to outer housing 10 in the vertical direction.

Leaf springs 10, 11 may be arranged over the entire circumference of the housing, or in segments.

Inner housing 9 at the same time defines the upper spring plate 4.

A lower spring plate 3 which is adjustable in height is connected to base 7.

Coil spring 2 now only enables vibration isolation in the vertical direction.

For providing horizontal vibration isolation, a flexible rod 13 is provided as an additional component, which is connected to the housing 9 and, through an upper fastening element 14, to the load 8 to be mounted with vibration isolation.

To obtain low horizontal stiffness, the flexible rod protrudes into an extension 15 of housing 9, which extends through the coil spring 2.

Thereby, the coupling point of flexible rod 13 to housing 9 is offset downwards, which at the same time reduces the tendency of the system to tilt.

The system is an active vibration isolation system which in addition to sensors comprises actuators 19 for active vibration isolation.

If now the level of the anti-vibration mounted load 8 is set using adjusting element 5, the load 8 will not be displaced in a horizontal direction due to the stiff coupling of the coil spring to the base 7, and horizontal adjustment of the vibration isolation system can be dispensed with.

Figure 3:
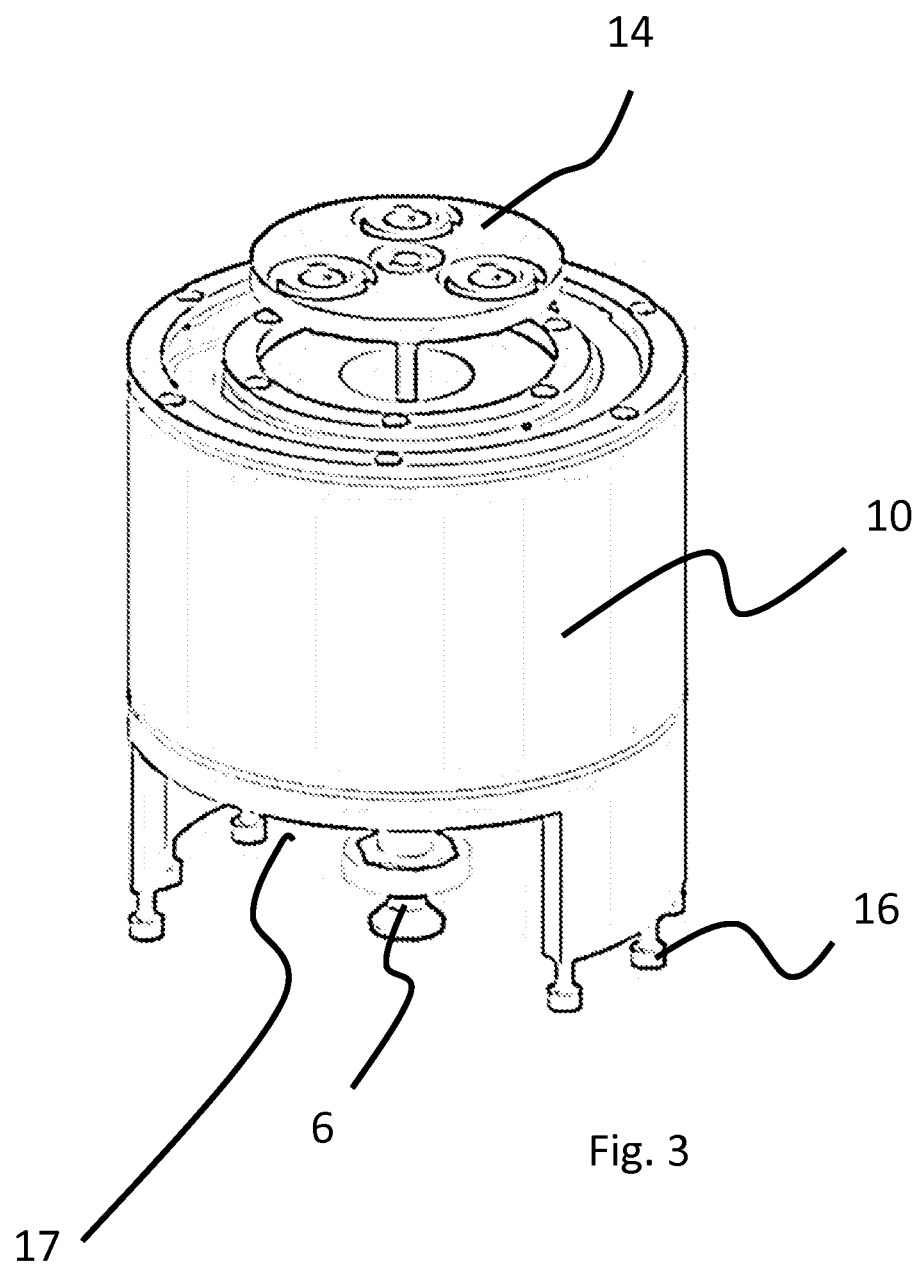
FIG. 3 shows a perspective view of the outer housing 10 of a vibration isolator.

FIG. 3 shows a perspective view of the outer housing 10 of a vibration isolator.

On the upper side, fastening element 14 can be seen, which is plate-shaped in this exemplary embodiment and by means of which the isolator is coupled with the anti-vibration mounted load.

Outer housing 10 is attached on the base (not shown) using fastening means 16 which are provided in form of screws in this exemplary embodiment. Further, the lower spring plate (not visible) is also connected to the base, by means of fastening element 6.

It will be understood that the entire assembly may be configured the other way round, i.e. that the outer housing and the lower spring plate are coupled to the load to be isolated. Preferably, however, the coil spring is stiffly coupled to the base.

Outer housing 10 which has a cylindrical shape further includes at least one recess 17 through which the adjusting element is accessible.

Figure 4:
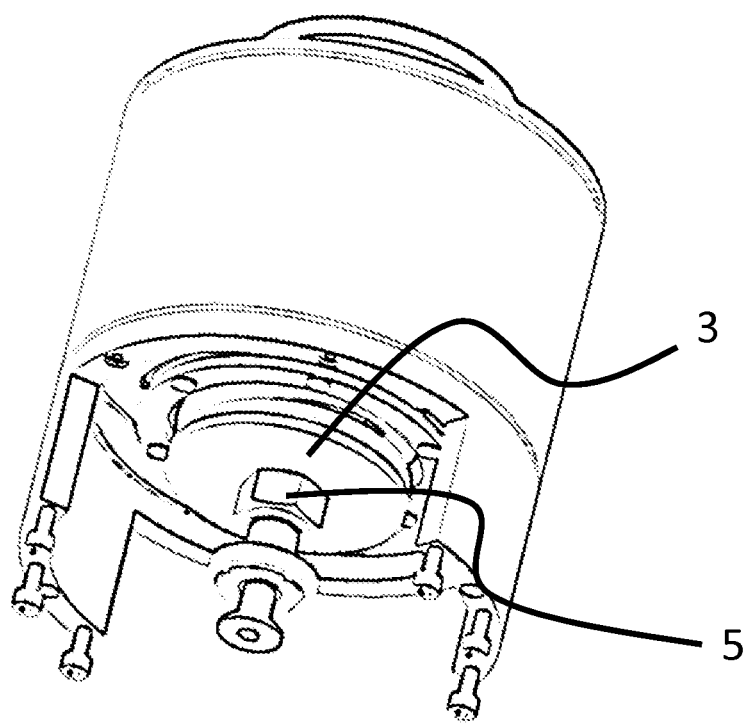
FIG. 4 shows a perspective view in which adjusting element 5 can be seen configured as a nut.

This can be seen particularly well in the perspective view of FIG. 4.

In particular adjusting element 5 can be seen which is configured as a nut and by means of which the lower spring plate 3 can be adjusted in height and thus also the anti-vibration mounted load (not shown).

Figure 5:
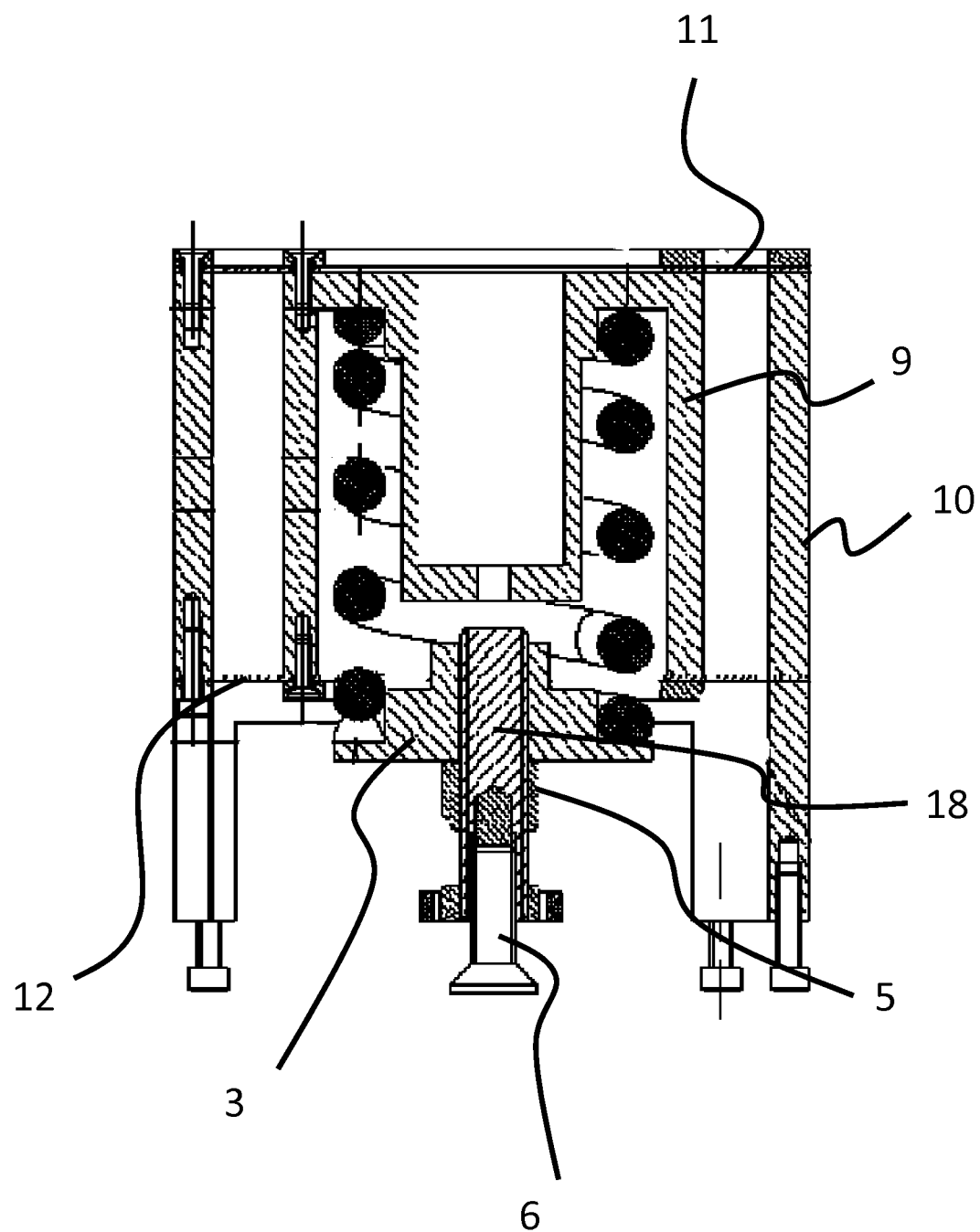
FIG. 5 shows another sectional view of components of a vibration isolator.

FIG. 5 shows another sectional view of components of a vibration isolator.

In particular the inner housing 9 can be seen here, which is connected with the outer housing 10 through spaced apart upper 11 and lower leaf springs 12, so that the inner and outer housings are only movable relative to one another in the vertical direction.

Furthermore, adjusting element 5 can be seen, which is formed as a nut and which sits on a threaded rod 18 and is used for adjusting the level of lower spring plate 3.

The threaded rod is connected to the base by means of lower fastening element 6 which is a screw in this exemplary embodiment.

The invention permits to provide in a simple manner a very effective mechanical vibration isolator including a coil spring, which allows for height adjustment without causing a displacement of the anti-vibration mounted load in a horizontal direction.

LIST OF REFERENCE NUMERALS

1 Vibration isolator
2 Coil spring
3 Lower spring plate
4 Upper spring plate
5 Adjusting element
6 Lower fastening element
7 Base
8 Load to be isolated
9 Housing
10 Outer housing
11 Upper leaf spring
12 Lower leaf spring
13 Flexible rod
14 Upper fastening element
15 Extension
16 Fastening means
17 Recess
18 Threaded rod
19 Actuator

What is claimed is:

1. A vibration isolator for vibration-isolated mounting of machines, comprising a base on which a load to be isolated is anti-vibration mounted with a coil spring that is effective in a vertical direction, the vibration isolator being adjustable in height by an adjusting element; wherein in a horizontal direction the coil spring is rigidly connected to the base or to the load to be isolated with at least one leaf spring which couples an inner housing in which the coil spring is arranged with an outer housing which is secured to the base or to the load to be isolated; and wherein the inner housing is movable relative to the outer housing only in the vertical direction.

2. The vibration isolator as claimed in claim 1, wherein the vibration isolator comprises a further component for providing horizontal vibration isolation.

3. The vibration isolator as claimed in claim 1, wherein the vibration isolator comprises a flexible rod through which the coil spring is coupled with the base or the load to be isolated, wherein the flexible rod is attached to an extension protruding into the coil spring.

4. The vibration isolator as claimed in claim 1, wherein in a horizontal direction the coil spring is rigidly connected to the base or to the load to be isolated with at least two leaf springs spaced from each other.

5. The vibration isolator as claimed in claim 2, wherein the coil spring is connected to a lower spring plate and to the inner housing which comprises an upper spring plate.

6. The vibration isolator as claimed in claim 1, wherein the outer housing comprises at least one recess through which the adjusting element is accessible.

7. The vibration isolator as claimed in claim 1, wherein the adjusting element comprises a threaded rod for height adjustment.

8. The vibration isolator as claimed in claim 1, wherein the adjusting element comprises a spring plate that is adjustable in height.

9. A vibration isolation system, comprising at least one vibration isolator as claimed in claim 1.

* * * * *